April 18, 1939.  H. N. DURHAM  2,154,497
AUTOMOTIVE VEHICLE
Filed March 11, 1937  2 Sheets-Sheet 2

INVENTOR
Hubert N Durham
BY
Morgan Finnegan and Durham
ATTORNEY

Patented Apr. 18, 1939

2,154,497

UNITED STATES PATENT OFFICE 2,154,497

AUTOMOTIVE VEHICLE

Hobart N. Durham, Munsey Park, N. Y., assignor to Differential Wheel Corporation, a corporation of Delaware Application March 11, 1937, Serial No. 130,236

10 Claims. (Cl. 188—18)

The present invention relates to heavy duty automotive vehicles and more particularly to novel and useful improvements in the braking mechanism for the dual road wheels forming part of the running gear of said vehicles.

Objects and advantages of the invention will be set forth in part hereinafter and in part will be obvious herefrom or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Figure 1:
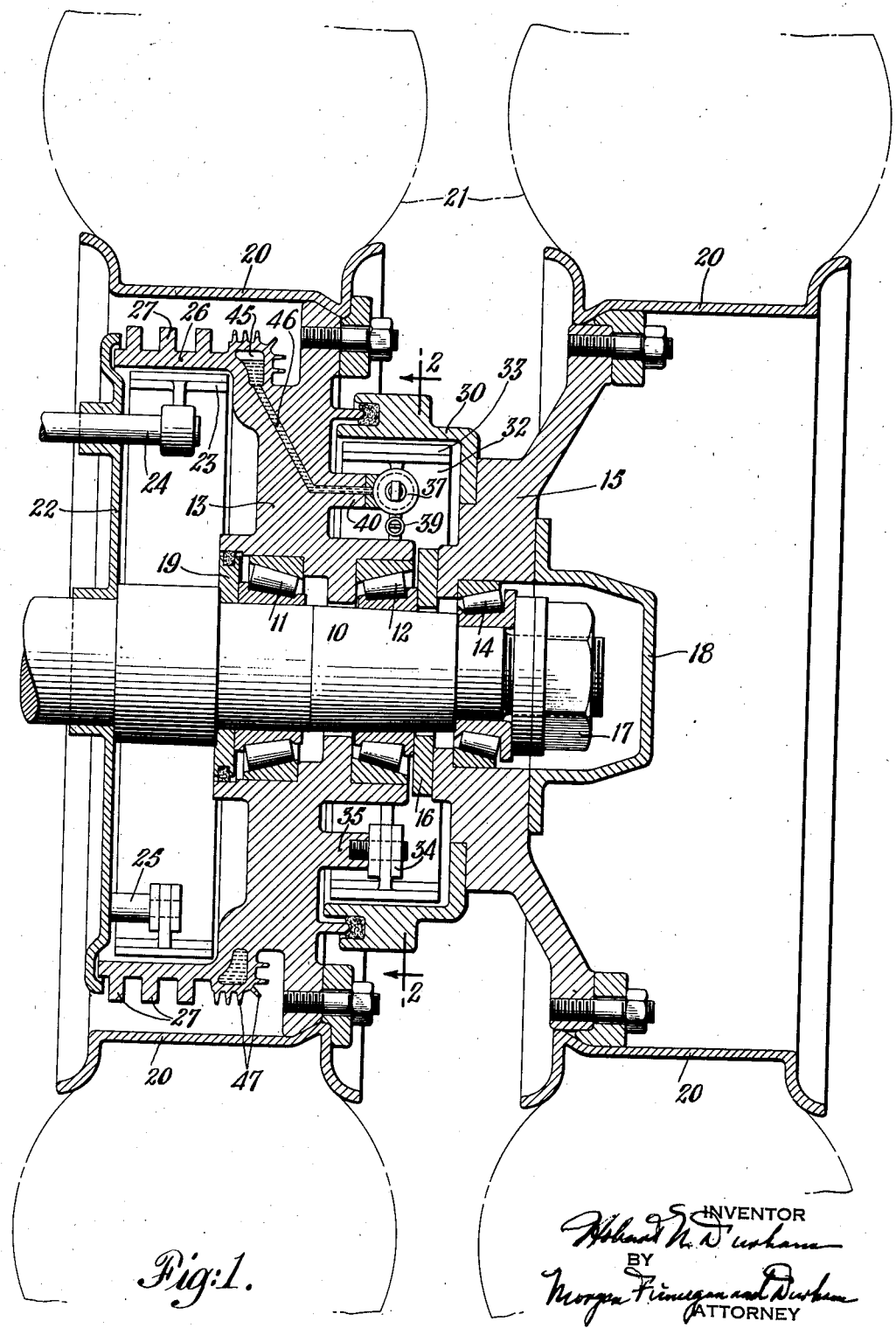
Figure 1 is a central vertical section showing the present illustrative embodiment of the invention.
Figure 2:
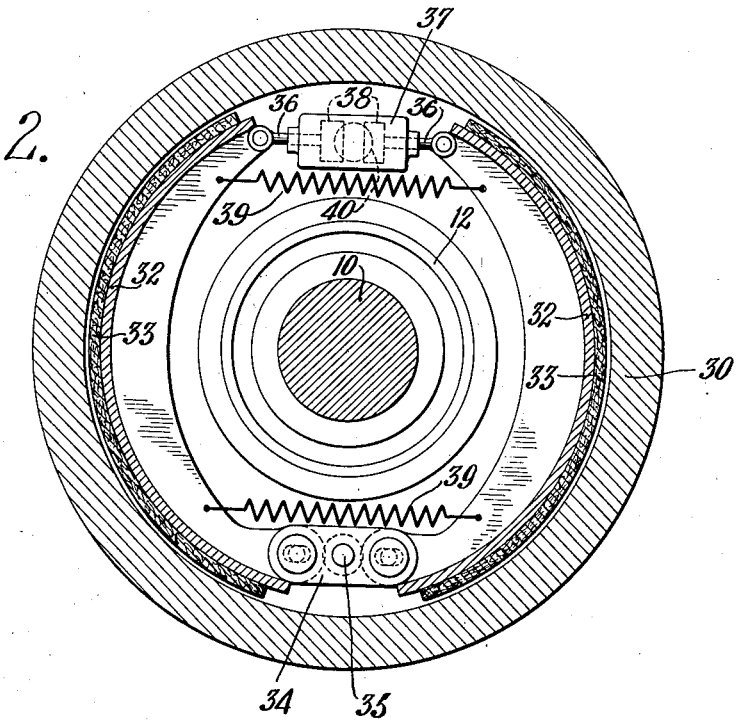
Figure 2 is a fragmentary sectional view taken on the line 2—2 of Figure 1.

The present invention has for its object the provision of a novel and improved dual wheel structure for automotive vehicles, and more particularly to a novel dual wheel structure in which the wheels are independently rotatable and are provided with means for braking both of the vehicle wheels. A further object of the invention is the provision of a novel dual wheel structure having independently rotatable wheels in which the movement of one of the dual wheels with the brake applied causes the application of the brake to the other wheel.

In the illustrative embodiment of the present invention, two dual wheels are mounted side-by-side in coaxial relation on a single axle and are adapted to be rotated independently or are capable of relative rotation with respect to each other, and means are provided for limiting or preventing such relative movement or independent rotation as the brake is applied to one wheel so that the vehicle is brought to a stop by both wheels exerting their retarding effect on the vehicle. As embodied, thermal means are provided for actuating a clutch member on one wheel to render it fast or relatively immovable with respect to the other wheel, and these thermal means are preferably actuated by the application of the brake to the inner wheel, the brake application resulting in sufficient heat to actuate the brake for the outer wheel. As embodied, the force for the outer wheel braking is generated by the heating of a thermally expansible fluid and the brake or clutch member between the wheels is actuated by this fluid pressure.

It will be understood the foregoing general description and the following detailed description as well are exemplary and explanatory of the invention but are not restrictive thereof.

Referring now in detail to the illustrative embodiment of the present invention as shown by the accompanying drawings, there is provided an axle having a spindle 10 on which are carried the tapered roller bearings 11 and 12 for the inner wheel 13 and the tapered roller bearing 14 for the outer wheel 15, a plain thrust bearing 16 being provided between the wheels 13 and 15 to take the axial thrust between the wheels. A nut 17 serves to retain the bearing and wheel assembly on the spindle 10, a hub cap 18 prevents the entry of dirt into the bearings, while a grease retaining ring 19 prevents the escape of grease onto the brake mechanism. Rims 20 and tires 21 are mounted on the wheels in any desired and conventional manner.

The inner wheel is provided with conventional brake mechanism comprising the backing plate 22, fixed to the axle and held fast thereon, the brake shoes 23, the operating mechanism 24 therefor and the anchor 25, while the brake drum 26 is fast to the inner face of the wheel 13, and may be provided with radiating fins 27 for the quicker radiation of the heat generated during the stoppage of the vehicle.

Means are provided for securely locking the wheels 13 and 15 against relative rotation, thereby preventing their independent rotation, so that when the brake is applied to the inner wheel, the outer wheel is also retarded. For this purpose there is provided a friction clutch between the two wheels, one of the clutch members being fastened to the inner wheel while the other clutch member is fastened to the outer wheel 15. As shown, there is provided a drum 30, similar to a brake drum, securely fastened to the inner face of the outer wheel 15, and within this drum are mounted shoes 32, similar to conventional brake shoes, normally spaced from the drum and held slightly out of contact therewith. Shoes 32 are provided with a facing 33 of friction material, and are pivotally anchored by means of the link 34 to an anchor post 35 projecting outwardly from the inner wheel 13. At their upper ends, shoes 32 are joined together by means of the piston rods 36 projecting from a cylinder 37 within which are the hydraulic pistons 38 of the hydraulic actuating means, while the shoes are normally held together, free of the drum 30, by means of the tension springs 39. Cylinder 37 is fixedly mounted to the inner wheel 13 by means of the projection 40, and thereby the shoe structure is carried and rotated by the inner wheel 13.

The clutch between the two wheels is adapted to be thermally and hydraulically actuated from the braking of the inner wheel, and for this purpose there is provided a small liquid reservoir 45 in thermal contact with the brake drum 26 of the inner wheel, and this reservoir is connected with the hydraulic cylinder 37 by means of a duct 46 which may be formed in the wheel member 13. Reservoir 45 is preferably formed as a small cavity on the exterior of the brake drum 26 in close contact therewith, and is also preferably provided with radiating fins 47 by which the heat is quickly dissipated so that the clutching of the two wheels together is not long continued after release of the inner wheel brake.

In the operation of the described embodiment, during the normal travel of the vehicle, the two wheels are free to rotate independently of each other and in turning a corner, the wheel nearest the center of the curve about which the vehicle is turning travels the shortest distance. During this normal operation, the brake shoes 23 are out of contact with the brake drum 26, and the clutch shoes 32 are out of contact with the clutch drum 30.

When the operator wishes to stop the vehicle, the actuator 24 is operated to apply the shoes 23 against the brake drum 26, retarding rotation of the inner wheel and heating the brake drum 26. This heating of the brake drum 26 causes the fluid in reservoir 45 to expand and the resulting increased pressure is transmitted through duct 46 to the hydraulic cylinder 37, moving pistons 38 apart and thereby forcing the clutch shoes 32 into contact with the clutch drum 30. The pressure is quickly built up sufficiently so that the shoes 32 are pressed against drum 30 with sufficient pressure to lock the two wheels immovably together. Thereby the braking effort applied to the inner wheel is transmitted through the clutch to the outer wheel 15 so as to retard its rotation and assist in stopping the vehicle.

As the inner wheel brake is released, the heat is dissipated from the brake drum through the radiating fins 47 and the liquid contracts, allowing springs 39 to retract the clutch shoes into non-contacting position, and once again permitting the independent rotation of the wheels.

Figure 3:
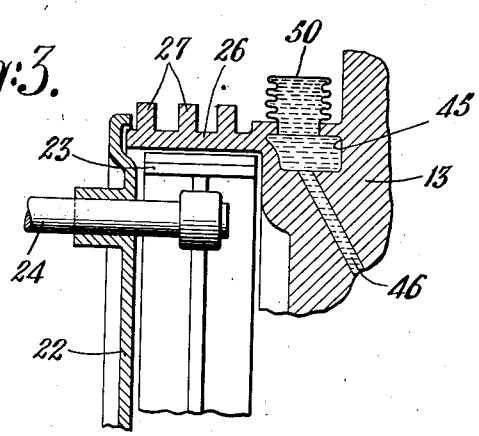
Figure 3 is a detailed, fragmentary sectional view of a modified form of the invention.

Figure 3 illustrates a modified embodiment of the invention in which means are provided for relieving excessive liquid pressure of the braking fluid. As embodied, there is a resiliently expansible chamber 50 of relatively small volume attached to the brake drum 26 and in communication with the liquid reservoir, so that excessive heating of the brake drum 26 can cause only a limited pressure between the clutch shoes 32 and the drum 30. In other respects, the construction and operation of this embodiment may be the same as that previously described.

The invention in its broader aspects is not limited to the specific mechanisms shown and described but departures may be made therefrom within the scope of the accompanying claims without departing from the principles of the invention and without sacrificing its chief advantages.

What I claim is:

1. In a dual wheel assembly for automotive vehicles, the combination of a pair of independently rotatable wheels mounted side by side, a clutch having relatively rotatable parts carried by the two wheels and hydraulic motor means for actuating the clutch to clutch the two wheels together and braking means associated with one of the wheels.

2. In a dual wheel assembly for automotive vehicles, the combination of a pair of independently rotatable wheels mounted side-by-side, a clutch having relatively rotatable parts carried by the two wheels, and thermally actuated means for engaging the clutch to prevent relative rotation of the wheels.

3. In a dual wheel assembly for automotive vehicles, the combination of a pair of independently rotatable wheels mounted side-by-side, a clutch having relatively rotatable parts carried by the two wheels and thermally actuated hydraulic means for engaging the clutch to prevent relative rotation of the wheels.

4. In a dual wheel assembly for automotive vehicles, the combination of a pair of independently rotatable wheels mounted side-by-side, a clutch having relatively rotatable parts carried by the two wheels, a brake operating on one of the wheels, hydraulic motor means for engaging the clutch to prevent relative rotation of the wheels and means for operating the hydraulic motor means by operation of the brake.

5. In a dual wheel assembly for automotive vehicles, the combination of a pair of independently rotatable wheels mounted side-by-side, a clutch having relatively rotatable parts carried by the two wheels, a brake operating on one of the wheels, means for engaging the clutch to prevent relative rotation of the wheels and thermally actuated by the application of the brake.

6. In a dual wheel assembly for automotive vehicles, the combination of a pair of independently rotatable wheels mounted side-by-side, a clutch having relatively rotatable parts carried by the two wheels, a brake operating on one of the wheels, hydraulic motor means for engaging the clutch to prevent relative rotation of the wheels, and means for increasing the pressure in the hydraulic motor means by the application of the brake.

7. In a dual wheel assembly for automotive vehicles, the combination of a pair of independently rotatable wheels mounted side-by-side, a clutch having relatively rotatable parts carried by the two wheels, a brake operating on one of the wheels, hydraulic motor means for engaging the clutch to prevent relative rotation of the wheels, said hydraulic motor means including a thermally expansible liquid, and means for heating and expanding the liquid by the application of the brake.

8. In a dual wheel assembly for automotive vehicles, the combination of a pair of independently rotatable wheels mounted side-by-side, a clutch having relatively rotatable parts carried by the two wheels, a brake operating on one of the wheels, hydraulic means for engaging the clutch to prevent relative rotation of the wheels, said hydraulic means including a liquid reservoir in thermally conductive relation to the brake.

9. In a dual wheel assembly for automotive vehicles, the combination of a pair of independently rotatable wheels mounted side-by-side, a clutch having relatively rotatable parts carried by the two wheels, and positioned between the two wheels, a hydraulic actuator for the clutch and fluid connections in one of the wheels for said actuator.

10. In a dual wheel assembly for automotive vehicles, the combination of a pair of independently rotatable wheels mounted side-by-side, a clutch having relatively rotatable parts carried by the two wheels, and positioned between the two wheels, a hydraulic actuator for the clutch, and fluid connections carried by one of the wheels for said actuator.

HOBART N. DURHAM.